(12) United States Patent
Berbecel et al.

(10) Patent No.: US 9,197,889 B2
(45) Date of Patent: *Nov. 24, 2015

(54) METHOD AND SYSTEM FOR MULTI-LAYER RATE CONTROL FOR A MULTI-CODEC SYSTEM

(71) Applicant: BROADCOM CORPORATION, Irvine, CA (US)

(72) Inventors: Gheorghe Berbecel, Irvine, CA (US); Xuemin Chen, Rancho Santa Fe, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,938

(22) Filed: Feb. 21, 2014

(65) Prior Publication Data

US 2014/0169454 A1 Jun. 19, 2014

Related U.S. Application Data

(63) Continuation of application No. 12/845,498, filed on Jul. 28, 2010, now Pat. No. 8,660,178.

(60) Provisional application No. 61/360,730, filed on Jul. 1, 2010.

(51) Int. Cl.
| | |
|---|---|
| *H04N 7/12* | (2006.01) |
| *H04N 11/02* | (2006.01) |
| *H04N 11/04* | (2006.01) |
| *H04N 5/14* | (2006.01) |
| *H04N 9/64* | (2006.01) |
| *H04N 7/01* | (2006.01) |
| *H04N 11/20* | (2006.01) |
| *G06K 9/32* | (2006.01) |
| *H04N 19/115* | (2014.01) |

(Continued)

(52) U.S. Cl.
CPC ......... *H04N 19/0006* (2013.01); *H04N 19/115* (2014.11); *H04N 19/124* (2014.11); *H04N 19/146* (2014.11); *H04N 19/152* (2014.11); *H04N 19/172* (2014.11); *H04N 19/176* (2014.11); *H04N 19/187* (2014.11); *H04N 19/61* (2014.11); *H04N 21/2365* (2013.01)

(58) Field of Classification Search
USPC .................................................. 375/240.03
See application file for complete search history.

(56) References Cited

U.S. PATENT DOCUMENTS

| | | |
|---|---|---|
| 5,457,495 A | 10/1995 | Hartung |
| 6,160,846 A | 12/2000 | Chiang et al. |

(Continued)

*Primary Examiner* — Hee-Yong Kim
(74) *Attorney, Agent, or Firm* — Oblon, McClelland, Maier & Neustadt, L.L.P.

(57) ABSTRACT

A video transmitter comprising a plurality of encoders may be operable to determine, for a transport stream, a constant overall number of bits per time interval corresponding to a frame in the transport stream. For each time interval corresponding to a start and an end of encoding of each of frames using each of the encoders, the video transmitter may allocate a target number of bits to each of the frames to achieve the constant overall number of bits. The allocation of the target number of bits may be based on frame types of the frames and CODEC types of the encoders, where the allocated target number of bits for each of the frames meets buffer overflow/underflow requirements associated with each of the encoders. A quantization parameter (QP) may be calculated and adjusted at each of one or more layers for generating an actual number of bits during encoding.

20 Claims, 4 Drawing Sheets

(51) Int. Cl.
*H04N 21/2365* (2011.01)
*H04N 19/176* (2014.01)
*H04N 19/172* (2014.01)
*H04N 19/61* (2014.01)
*H04N 19/124* (2014.01)
*H04N 19/146* (2014.01)
*H04N 19/152* (2014.01)
*H04N 19/187* (2014.01)

(56) References Cited

U.S. PATENT DOCUMENTS

| | | |
|---|---|---|
| 6,480,539 B1 | 11/2002 | Ramaswamy |
| 2004/0202248 A1 | 10/2004 | Boroczky et al. |
| 2007/0206674 A1 | 9/2007 | Ziauddin et al. |
| 2009/0041118 A1* | 2/2009 | Pavlovskaia et al. .... 375/240.01 |
| 2011/0122224 A1* | 5/2011 | Lou .................................. 348/42 |

* cited by examiner

METHOD AND SYSTEM FOR MULTI-LAYER RATE CONTROL FOR A MULTI-CODEC SYSTEM

CROSS-REFERENCE TO RELATED APPLICATIONS/INCORPORATION BY REFERENCE

This application is a continuation of and is based upon and claims the benefit of priority under 35 U.S.C. §120 for U.S. Ser. No. 12/845,498, filed Jul. 28, 2010, and makes reference to, claims priority to, and claims benefit from U.S. Provisional Application Ser. No. 61/360,730, which was filed on Jul. 1, 2010.

The above stated application is hereby incorporated herein by reference in its entirety.

FIELD OF THE INVENTION

Certain embodiments of the invention relate to video processing. More specifically, certain embodiments of the invention relate to a method and system for multi-layer rate control for a multi-codec system.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Various video encoding standards, for example, MPEG-1, MPEG-2, MPEG-4, H.263, advanced video coding (AVC) and VC-1, have been established for encoding digital video sequences in a compressed manner. A frame in a compressed video may be coded in three possible frame or picture types, namely, I-frame (or I-picture), P-frame (or P-picture) and B-frame (or B-picture). I-frames are the least compressible but don't require other video frames to decode. P-frames may use data from previous frames to decompress or decode and are more compressible than I-frames. B-frames may use both previous and forward frames for data reference to get the highest amount of data compression. The I-frames are the largest in terms of bits per frame, the P-frames have fewer bits than the I-frames and the B-frames have even fewer bits than the P-frames.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for multi-layer rate control for a multi-codec system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for multi-layer rate control for a multi-codec system. In various embodiments of the invention, a video transmitter, which may comprise a plurality of encoders with different CODECs, may be operable to determine, for a transport stream, a constant overall number of bits per time interval that corresponds to transferring a frame in the transport stream. The transport stream may comprise a plurality of video streams that are concurrently generated from two or more of the plurality of encoders. For each time interval that corresponds to a start and an end of encoding of each of a plurality of frames using each of the two or more of the plurality of encoders, the video transmitter may be operable to allocate a target number of bits to each of the plurality of frames to achieve the constant overall number of bits. The allocation of the target number of bits may be based on a frame type of each of the plurality of frames and a CODEC type of each of the two or more of the plurality of encoders, where the allocated target number of bits for each of the plurality of frames meets buffer overflow/underflow requirements associated with each of the two or more of the plurality of encoders. In this regard, a target number of bits may be determined for a macroblock (MB) of each of the plurality of frames in each of the plurality of video streams based on the allocated target number of bits of the frame. Accordingly, a quantization parameter (QP) for the macroblock (MB) may be calculated by the video transmitter based on the determined target number of bits of the macroblock (MB).

In an exemplary embodiment of the invention, the video transmitter may be operable to determine rate control information associated with the macroblock (MB) at each of one or more layers of the video stream. A layer may comprise a multi-group of pictures (multi-GOP), a group of pictures (GOP), a frame, a multi-macroblock (multi-MB) and/or a macroblock (MB). The calculated quantization parameter (QP) may be adjusted at each of the one or more layers based on the rate control information at each of the one or more layers so as to generate a final quantization parameter (QP). An actual number of bits may be generated by the video transmitter during encoding of the macroblock (MB) utilizing the final quantization parameter (QP). In this regard, for example, the rate control information at a layer may comprise a bit error. The bit error is a difference between an actual number of bits generated during encoding for the layer and a target number of bits corresponding to the actual number of bits for the layer. In an exemplary embodiment of the invention, the video transmitter may be operable to adjust the calculated quantization parameter (QP) based on a proportional value, an integral value and/or a derivative value of the bit error at each of the one or more layers. In an exemplary embodiment of the invention, the video transmitter may be operable to adjust a total number of frames in a group of pictures (GOP) for each of one or more of the plurality of video streams to flexibly enable the allocation of the target number of bits to each of the plurality of frames.

Figure 1:
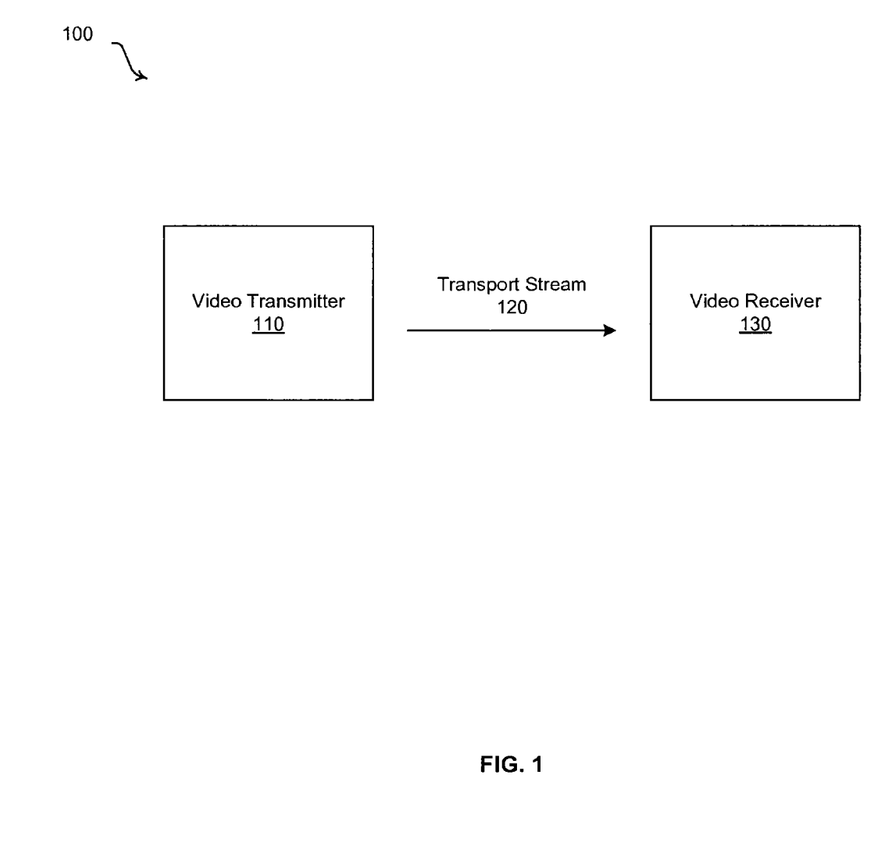
FIG. 1 is a block diagram illustrating an exemplary video communication system that is operable to provide multi-layer rate control for a multi-codec system, in accordance with an embodiment of the invention.

FIG. 1 is a block diagram illustrating an exemplary video communication system that is operable to provide multi-layer rate control for a multi-codec system, in accordance with an embodiment of the invention. Referring to FIG. 1, there is shown a video communication system 100. The video communication system 100 may comprise a video transmitter 110, a transport stream 120 and a video receiver 130.

The video transmitter 110 may comprise suitable logic, circuitry, interfaces and/or code that may be operable to distribute encoded or compressed video content to the video receiver 130 via a bitstream such as the transport stream 120. The video transmitter 110, such as, for example, a headend system may be operable to provide various services such as, for example, distribution, multicast, and/or quality of service necessary for a reliable and timely transmission of the compressed video content to the video receiver 130. The video transmitter 110 may utilize, for example, a cable TV network, a satellite broadcasting network, the Internet protocol (IP) data network such as the Internet, and/or a wireless communication network for delivery of services or the compressed video content to the video receiver 130.

In an exemplary embodiment of the invention, the video transmitter 110 may comprise a plurality of encoders with different CODECs. For example, an encoder may comprise a MPEG-2 encoder, a MPEG-4 encoder, an AVC encoder and/or a VC-1 encoder. The transport stream 120 may comprise a plurality of video streams which may be concurrently generated from the plurality of encoders.

A video stream may be organized in a layered structure in which a syntactic structure may comprise one or more subordinate structures. In this instance, for example, a video stream may comprise a series of multi-GOPs. For example, a multi-GOP may be a video sequence, and may comprise a plurality of GOPs. Each of the plurality of GOPs may comprise one I-frame, several P-frames and/or several B-frames. A frame may comprise a series of multi-MBs. For example, a multi-MB may be a slice of a frame. A multi-MB may comprise a plurality of MBs that are subsequent in time. The MB is the lowest layer or level in the layered structure.

The video receiver 130 may comprise suitable logic, circuitry, interfaces and/or code that may be operable to receive the compressed video via the transport stream 120 from the video transmitter 120. The video receiver 130 such as, for example, a set-top box (STB) may be operable to decode or decompress the received compressed video. In an exemplary embodiment of the invention, the video receiver 130 may comprise a plurality of decoders with different CODECs. For example, a decoder may comprise a MPEG-2 decoder, a MPEG-4 decoder, an AVC decoder and/or a VC-1 decoder.

In operation, a video transmitter 110, which may comprise a plurality of encoders with different CODECs, may be operable to determine, for a transport stream 120, a constant overall number of bits per time interval that corresponds to transferring a frame in the transport stream 120. The transport stream 120 may comprise a plurality of video streams that are concurrently generated from two or more of the plurality of encoders. For each time interval that corresponds to a start and an end of encoding of each of a plurality of frames using each of the two or more of the plurality of encoders, the video transmitter 110 may be operable to allocate a target number of bits to each of the plurality of frames to achieve the constant overall number of bits. The allocation of the target number of bits may be based on a frame type of each of the plurality of frames and a CODEC type of each of the two or more of the plurality of encoders, while the allocated target number of bits for each of the plurality of frames may still need to meet buffer overflow/underflow requirements associated with each of the two or more of the plurality of encoders.

Based on a hypothetical reference decoder (HRD) model associated with a rate control operation, a decoder buffer in the video receiver 130 may overflow in instances when the decoder buffer becomes full and more compressed bits are arriving from the transport stream 120. The decoder buffer may underflow in instances when the removal time for a frame for decoding occurs before all compressed bits representing the frame have arrived. Similarly, an encoder buffer in the video transmitter 110 may overflow in instances when the encoder buffer becomes full and more compressed bits are arriving from a corresponding encoder. The encoder buffer may underflow in instances when the removal time for a frame for transmission to the video receiver 130 via the transport stream 120 occurs before all compressed bits representing the frame have arrived at the encoder buffer from the corresponding encoder. A purpose of any rate control operation is to generate the number of bits representing a frame such that both the encoder buffer and the decoder buffer do not overflow and do not underflow. Accordingly, while the allocation of the target number of bits to a frame may be based on a frame type of each of the plurality of frames and a CODEC type of each of the two or more of the plurality of encoders, the allocated target number of bits for each of the plurality of frames may still need to satisfy the buffer overflow/underflow conditions associated with each of the two or more of the plurality of encoders.

In an exemplary embodiment of the invention, stuffing bits may be inserted into the transport stream 120 so that the constant overall numbers of bits may be achieved as well as the buffer overflow/underflow requirements may be met. The stuffing bits are inserted code-words that will be discarded in the decoding process in the video receiver 130.

A target number of bits may be determined for a macroblock (MB) of each of the plurality of frames in each of the plurality of video streams based on the allocated target number of bits of the frame. For example, I-frames are the largest in terms of bits per frame, P-frames have fewer bits than I-frames and B-frames have even fewer bits than P-frames. In instances when the next frame to be encoded is an I-frame, which may require a larger number of bits, the video transmitter 110 may allocate the particular bit rate for the I-frame to be larger so that a larger size in bits for the I-frame may be made possible. For example, a VC-1 encoded B-frame may comprise significantly smaller number of bits when compared to a P-frame due to the fact that B-frames in the VC-1 encoding may allow bi-directional prediction. An AVC encoded B-frame may comprise a number or quantity of bits which may not be that different from a P-frame due to the fact that P-frames in the AVC encoding may also allow bi-direction prediction.

A quantization parameter (QP) for the macroblock (MB) may be calculated by the video transmitter 110 based on the determined target number of bits of the macroblock (MB). The quantization parameter (QP) such as, for example, a quantization level (QL) may be derived for the purpose of actually producing bits in a video stream in the transport stream 120.

In an exemplary embodiment of the invention, the video transmitter 110 may be operable to determine rate control information associated with the macroblock (MB) at each of one or more layers of the video stream. For example, a layer may comprise a multi-GOP, a GOP, a frame, a multi-MB and/or a macroblock (MB). The calculated quantization parameter (QP) may be adjusted at each of the one or more layers based on the rate control information at each of the one or more layers so as to generate a final quantization parameter (QP). For example, the rate control information at a layer may comprise a bit error. The bit error is the difference between an actual number of bits generated during encoding for the layer and a target number of bits corresponding to the actual number of bits for the layer. In an exemplary embodiment of the invention, the video transmitter 110 may be operable to adjust the calculated quantization parameter (QP) based on a proportional value, an integral value and/or a derivative value of the bit error at each of the one or more layers.

In reference to a proportional integral derivative (PID) control system, the proportional value or term of the bit error may represent the actual error or offset. The proportional value may determine a rate control action based on current error. The integral value or term of the bit error examines a history of the bit error and may represent the past aspect of the bit error. The integral value may determine a rate control action based on a sum of recent errors. The derivative value or term of the bit error detects rapid changes of the bit error and may represent the future aspect of the bit error. The derivative value may determine a rate control action based on a rate at which the error has been changing.

An actual number of bits may be generated by the video transmitter 110 during encoding of the macroblock (MB) utilizing the final quantization parameter (QP). Accordingly, a video stream for each of the plurality of encoders may be produced as a result of a multi-layer rate control. While more than one video streams are concurrently produced at different number of bits per frame, which may also be variable over time, the sum of these numbers of bits per frame may still be constant as imposed in the transport stream 120.

In an exemplary embodiment of the invention, the video transmitter 110 may be operable to adjust a total number of frames in a group of pictures (GOP) for each of one or more of the plurality of video streams so as to flexibly enable the allocation of the target number of bits to each of the plurality of frames. For example, the total numbers of frames in the GOPs of some video streams may be increased and/or the total numbers of frames in the GOPs of some video streams may be decreased so as to avoid I-frames occurring at the same time. In instances when it is hard to allocate the target number of bits to frames so as to achieve the constant overall number of bits, due to the requirement of satisfying the buffer overflow/underflow conditions, the total number of frames in the GOP of a video stream may be increased to provide flexibility for bits allocation, for example.

Although in FIG. 1, multiple CODEC streams that share a transport stream 120 is illustrated, the invention may not be so limited. Accordingly, shared encoder buffer and/or shared decoder buffer may also be illustrated and taken into consideration during a rate control operation. In these instances, the buffer overflow/underflow requirements may be required to meet for the shared encoder buffer and/or the shared decoder buffer during the rate control operation.

Figure 2:
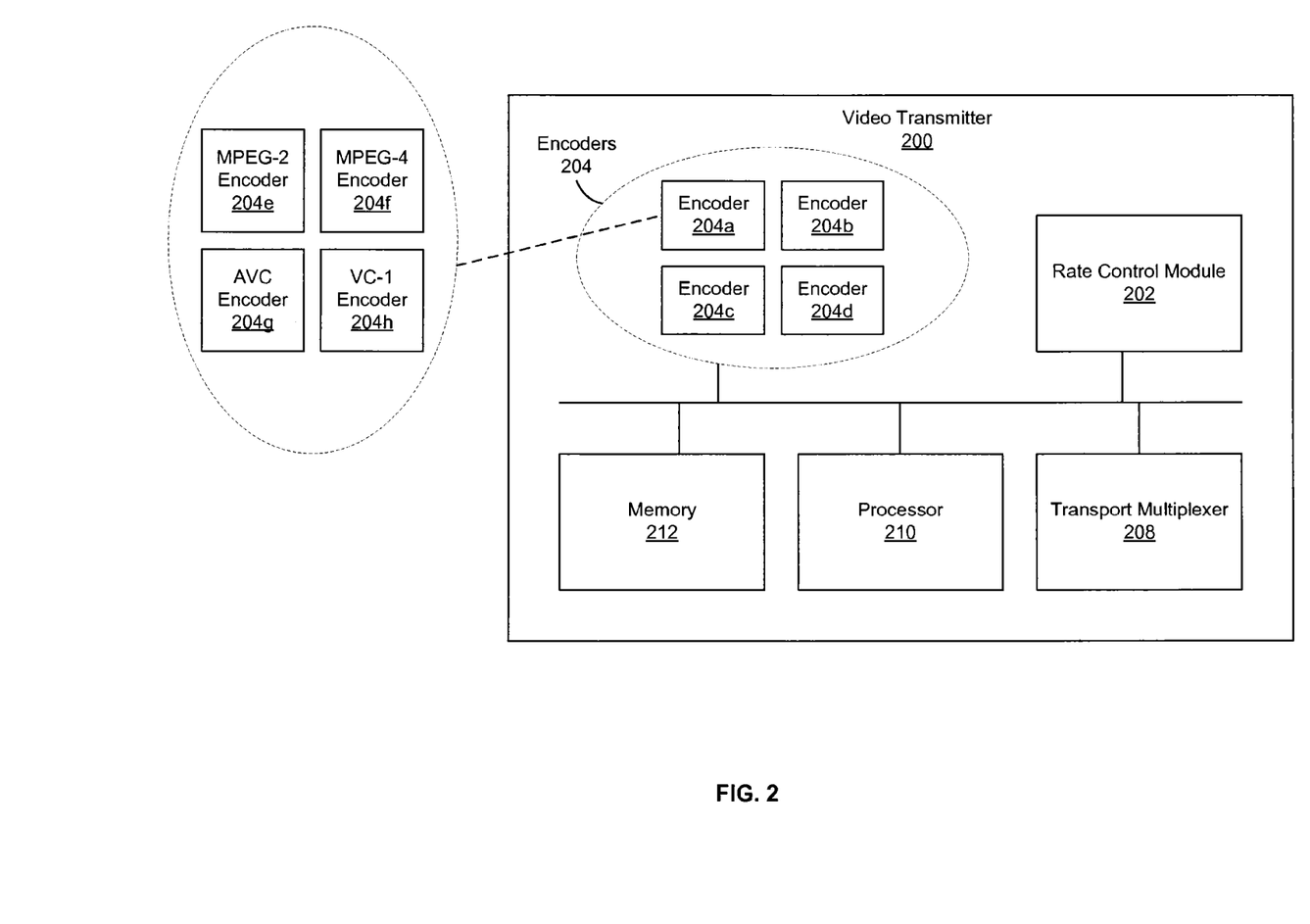
FIG. 2 is a block diagram illustrating an exemplary video transmitter that is operable to provide multi-layer rate control for a multi-codec system, in accordance with an embodiment of the invention.

FIG. 2 is a block diagram illustrating an exemplary video transmitter that is operable to provide multi-layer rate control for a multi-codec system, in accordance with an embodiment of the invention. Referring to FIG. 2, there is shown a video transmitter 200. The video transmitter 200 may comprise a rate control module 202, a plurality of encoders 204 of which encoders 240a-240d are illustrated, a transport multiplexer 208, a processor 210 and a memory 212.

The rate control module 202 may comprise suitable logic, circuitry, interfaces and/or code that may be operable to perform a rate control for each of the plurality of encoders 204. In an exemplary embodiment of the invention, the rate control module 202 may be operable to allocate, for each time interval that corresponds to a start and an end of encoding of a frame, a particular bit rate for a video stream for each of the plurality of encoders 204, based on a constant overall bit rate for a transport stream such as the transport stream 120. The rate control module 202 may be operable to perform the rate control by taking actions at multiple layers of the video stream for each of the plurality of encoders 204.

Each of the plurality of encoders 204 such as the encoder 204a may comprise suitable logic, circuitry, interfaces and/or code that may be operable to encode video content to generate a video stream. The encoder 204a may be operable to produce bits for each macroblock (MB) of each of frames in the video stream using a finally adjusted quantization parameter (QP) such as, for example, a finally adjusted quantization level (QL), which may be generated by the rate control module 202. The encoder 204a may comprise a MPEG-2 encoder 204e, a MPEG-4 encoder 204f, an AVC encoder 204g, and/or a VC-1 encoder 204h, for example.

The transport multiplexer 208 may comprise suitable logic, circuitry, interfaces and/or code that may be operable to merge a plurality of video streams which may be generated by one or more of the plurality of encoders 204 into a combined bitstream for transmitting to a video receiver such as the video receiver 130.

The processor 210 may comprise suitable logic, circuitry, interfaces and/or code that may be operable to communicate with the rate control module 202, the plurality of encoders 204 and the transport multiplexer 208 to perform various functions of the video transmitter 200 such as the multi-layer rate control function.

The memory 212 may comprise suitable logic, circuitry, interfaces and/or code that may be operable to store information such as executable instructions and data that may be utilized by the processor 210, the rate control module 202, the plurality of encoders 204 and/or the transport multiplexer 208 to perform various functions of the video transmitter 200.

In operation, a rate control module 202 may be operable to determine, for a transport stream 120, a constant overall number of bits per time interval that corresponds to transferring a frame in the transport stream such as the transport stream 120. The transport stream 120 may comprise a plurality of video streams that are concurrently generated from two or more of the plurality of encoders 204. For each time interval that corresponds to a start and an end of encoding of each of a plurality of frames using each of the two or more of the plurality of encoders 204, the rate control module 202 may be operable to allocate a target number of bits to each of the plurality of frames so as to achieve the constant overall number of bits. The allocation of the target number of bits may be based on a frame type of each of the plurality of frames and a CODEC type of each of the two or more of the plurality of encoders 204, where the allocated target number of bits for each of the plurality of frames meets buffer overflow/underflow requirements associated with each of the two or more of the plurality of encoders 204.

A target number of bits may be determined for a macroblock (MB) of each of the plurality of frames in each of the plurality of video streams based on the determined target number of bits of the frame. A quantization parameter (QP)

for the macroblock (MB) may be calculated by the rate control module 202 based on the determined target number of bits of the macroblock (MB).

In an exemplary embodiment of the invention, the rate control module 202 may be operable to determine rate control information associated with the macroblock (MB) at each of one or more layers of the video stream. For example, a layer may comprise a multi-GOP, a GOP, a frame, a multi-MB and/or a macroblock (MB). The calculated quantization parameter (QP) may be adjusted at each of the one or more layers based on the rate control information at each of the one or more layers so as to generate a final quantization parameter (QP). For example, the rate control information at a layer may comprise a bit error. The bit error is the difference between an actual number of bits generated during encoding for the layer and a target number of bits corresponding to the actual number of bits for the layer. In an exemplary embodiment of the invention, the rate control module 202 may be operable to adjust the calculated quantization parameter (QP) based on a proportional value, an integral value and/or a derivative value of the bit error at each of the one or more layers.

An encoder such as the encoder 204a may be operable to generate an actual number of bits during encoding of the macroblock (MB) utilizing the associated final quantization parameter (QP). Accordingly, a video stream for each of the plurality of encoders 204 may be produced as a result of a multi-layer rate control. While more than one video streams are concurrently produced at different number of bits per frame, that may also be variable over time, the sum of these numbers of bits per frame may still be constant as imposed in the transport stream 120.

During a rate control operation, the rate control module 202 may be operable to increase or decrease a total number of frames in a group of pictures (GOP) for each of one or more of the plurality of video streams so as to flexibly enable the allocation of the target number of bits to each of the plurality of frames.

In an exemplary embodiment of the invention, the times when the frames arrive at the plurality of encoders 240 may not coincide. In this instance, the rate control module 202 may be operable to perform the rate control for each time interval between two arrived frames. In this regard, the time intervals perceived by the rate control module 202 may not be constant time intervals, for example.

Figure 3:
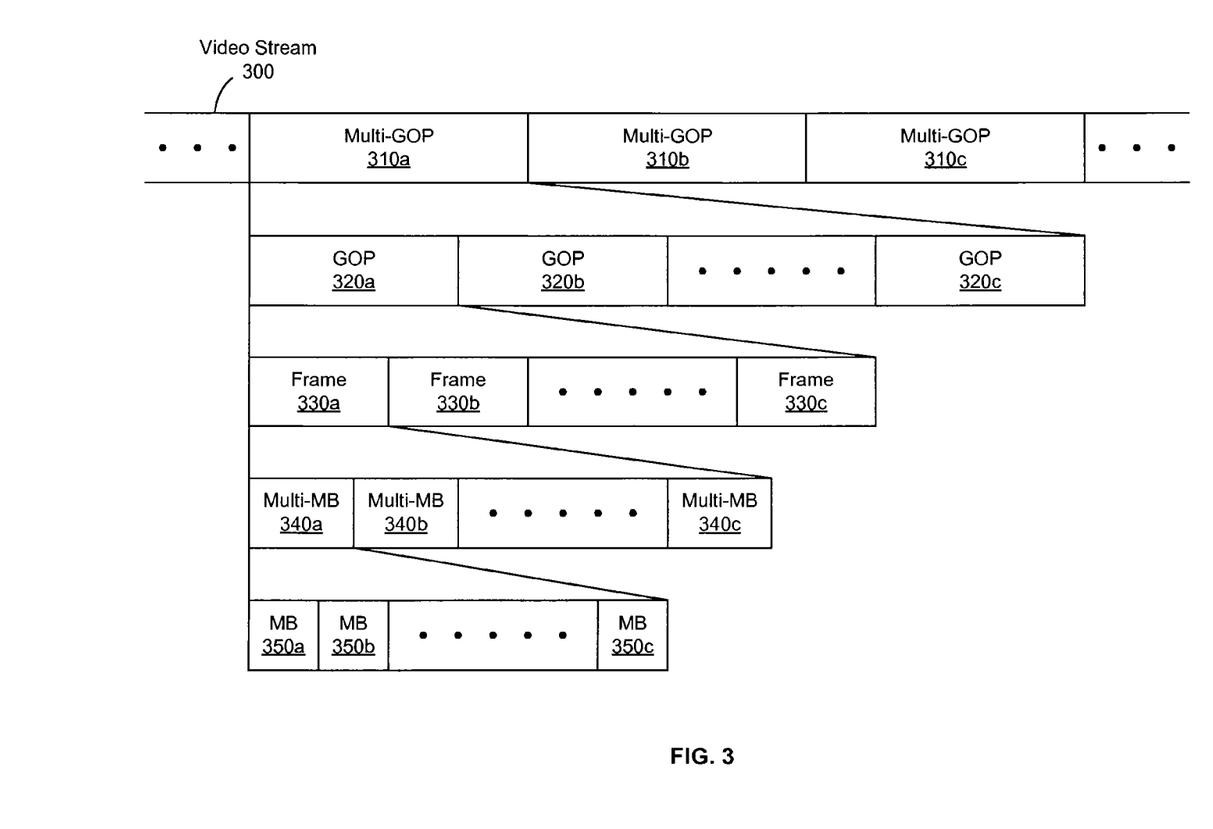
FIG. 3 is a block diagram illustrating an exemplary video stream comprising multiple layers, in accordance with an embodiment of the invention.

FIG. 3 is a block diagram illustrating an exemplary video stream comprising multiple layers, in accordance with an embodiment of the invention. Referring to FIG. 3, there is shown a video stream 300. The video stream 300 may be, for example, a MPEG-2 video stream, a MPEG-4 video stream, an AVC video stream or a VC-1 video stream. The video stream 300 may comprise a plurality of multi-GOPs such as multi-GOPs 310a, 310b, 310c. A multi-GOP, such as the multi-GOP 310a, may comprise a plurality of GOPs such as GOPs 320a, 320b, 320c. A GOP, such as the GOP 320a, may comprise a plurality of frames such as frames 330a, 330b, 330c. A frame, such as the frame 330a, may comprise a plurality of multi-MBs such as the multi-MBs 340a, 340b, 340c. A multi-MB, such as the multi-MB 340a, may comprise a plurality of macroblocks (MBs) such as MBs 350a, 350b, 350c.

In an exemplary embodiment of the invention, the rate control module 202 in the video transmitter 200 may be operable to determine rate control information associated with a MB such as the MB 350a at each of one or more layers such as the multi-GOP 310a, the GOP 320a, the frame 330a, the multi-MB 340a and/or the MB 350a. For example, the rate control module 202 may track bit errors at the multi-GOP 310a, the GOP 320a, the frame 330a, the multi-MB 340a and/or the MB 350a, and to take appropriate actions to minimize the bit errors at all of the layers. In addition to the bit error, the rate control information may comprise, for example, an actual number of bits generated from multiple GOPs at multi-GOP 310a, a frame type structure of the GOP 320a, a frame type of the frame 330a, an average number of bits generated per multi-MB in the frame 330a, a total number of MBs in the multi-MB 340a and/or a variance of luminance pixels in the MB 350a.

Figure 4:
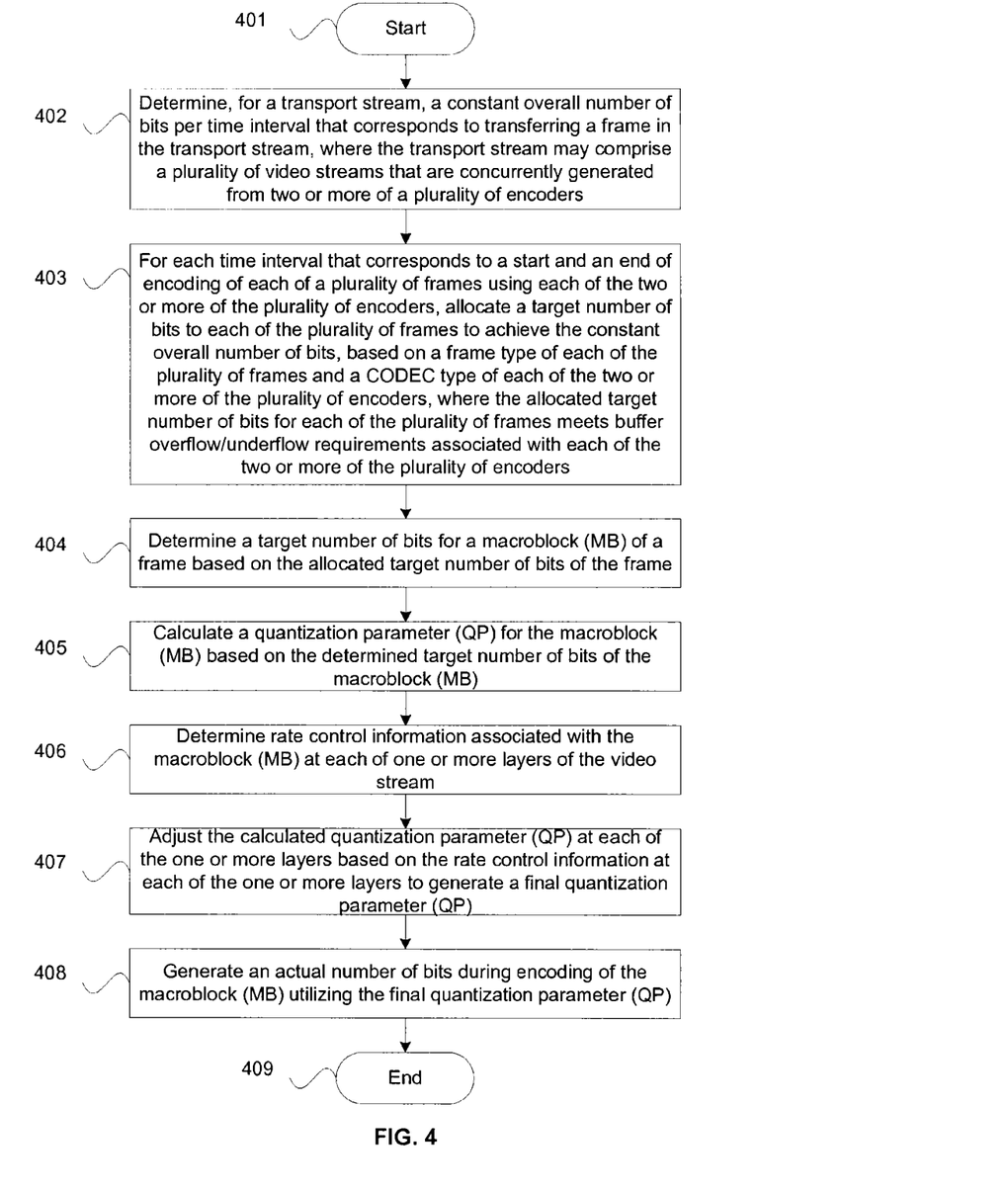
FIG. 4 is a flow chart illustrating exemplary steps for multi-layer rate control for a multi-codec system, in accordance with an embodiment of the invention.

FIG. 4 is a flow chart illustrating exemplary steps for multi-layer rate control for a multi-codec system, in accordance with an embodiment of the invention. Referring to FIG. 4, the exemplary steps start at step 401. In step 402, the rate control module 202 in the video transmitter 200 may be operable to determine, for a transport stream 120, a constant overall number of bits per time interval that corresponds to transferring a frame in the transport stream 120. The transport stream 120 may comprise a plurality of video streams that are concurrently generated from two or more of the plurality of encoders 204 in the video transmitter 200. In step 403, for each time interval that corresponds to a start and an end of encoding of each of a plurality of frames using each of the two or more of the plurality of encoders 204, the rate control module 202 may be operable to allocate a target number or bits to each of the plurality of frames to achieve the constant overall bit rate, based on a frame type of each of the plurality of frames and a CODEC type of each of the two or more of the plurality of encoders 204, where the allocated target number of bits for each of the plurality of frames meets buffer overflow/underflow requirements associated with each of the two or more of the plurality of encoders 204.

In step 404, a target number of bits for a macroblock (MB) of a frame may be determined by the rate control module 202 based on the allocated target number of bits of the frame. In step 405, a quantization parameter (QP) for the macroblock (MB) may be calculated by the rate control module 202 based on the determined target number of bits of the macroblock (MB). In step 406, the rate control module 202 may be operable to determine rate control information associated with the macroblock (MB) at each of one or more layers of the video stream. In step 407, the rate control module 202 may be operable to adjust the calculated quantization parameter (QP) at each of the one or more layers based on the rate control information at each of the one or more layers to generate a final quantization parameter (QP). In step 408, one of the encoders 204 may be operable to generate an actual number of bits during encoding of the macroblock (MB) utilizing the final quantization parameter (QP). The exemplary steps may proceed to the end step 409.

In various embodiments of the invention, a video transmitter 200 may comprise a rate control module 202 and a plurality of encoders 204 with different CODECs. The rate control module 202 may be operable to determine, for a transport stream 120, a constant overall number of bits per time interval that corresponds to transferring a frame in the transport stream 120. The transport stream 120 may comprise a plurality of video streams that are concurrently generated from two or more of the plurality of encoders 204. For each time interval that corresponds to a start and an end of encoding of each of a plurality of frames using each of the two or more of the plurality of encoders 204, the rate control module 202 may be operable to allocate a target number of bits to each of the plurality of frames to achieve the constant overall number of bits. The allocation of the target number of bits may be based on a frame type of each of the plurality of frames and a CODEC type of each of the two or more of the plurality of encoders 204, where the allocated target number of bits for each of the plurality of frames meets buffer overflow/underflow requirements associated with each of the two or more of the plurality of encoders 204. In this regard, a target number of bits may be determined for a macroblock (MB) of each of the plurality of frames in each of the plurality of video streams based on the allocated target number of bits of the frame. Accordingly, a quantization parameter (QP) for the macroblock (MB) may be calculated by the rate control module 202 based on the determined target number of bits of the macroblock (MB).

In an exemplary embodiment of the invention, the rate control module 202 may be operable to determine rate control information associated with the macroblock (MB) at each of one or more layers of the video stream. A layer may comprise a multi-GOP, a GOP, a frame, a multi-MB and/or a MB. The calculated quantization parameter (QP) may be adjusted at each of the one or more layers based on the rate control information at each of the one or more layers so as to generate a final quantization parameter (QP). An actual number of bits may be generated by the corresponding encoder such as the encoder 204a during encoding of the macroblock (MB) utilizing the final quantization parameter (QP). In this regard, for example, the rate control information at a layer may comprise a bit error. The bit error is the difference between an actual number of bits generated during encoding for the layer and a target number of bits corresponding to the actual number of bits for the layer. In an exemplary embodiment of the invention, the rate control module 202 may be operable to adjust the calculated quantization parameter (QP) based on a proportional value, an integral value and/or a derivative value of the bit error at each of the one or more layers.

In an exemplary embodiment of the invention, the rate control module 202 may be operable to adjust a total number of frames in a group of pictures (GOP) for each of one or more of the plurality of video streams so as to flexibly enable the allocation of the target number of bits to each of the plurality of frames.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multi-layer rate control for a multi-codec system.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   determining an overall number of bits per time interval that corresponds to transferring a frame in a transport stream, the transport stream including a plurality of streams each generated according to a different encoding standard; and
   allocating, by circuitry, a target number of bits to each of a plurality of frames of the plurality of streams to achieve the overall number of bits for the transport stream based on a frame type of each of the plurality of frames and the different encoding standards according to which each of the plurality of streams is generated.

2. The method of claim 1, comprising:
   determining a target number of bits for a macroblock of each of the plurality of frames based on the target number of bits allocated to each of the plurality of frames.

3. The method of claim 2, comprising:
   calculating a quantization parameter for the macroblock based on the target number of bits determined for the macroblock.

4. The method of claim 3, comprising:
   determining rate control information associated with the macroblock at each of one or more layers of each of the plurality of streams.

5. The method of claim 4, comprising:
   adjusting the quantization parameter calculated for each of the one or more layers based on the rate control information at each of the one or more layers to generate a final quantization parameter.

6. The method of claim 4, wherein
   the rate control information at a layer comprises a bit error that corresponds to a difference between an actual number of bits generated during encoding for the layer and a target number of bits corresponding to the actual number of bits for the layer.

7. The method of claim 6, comprising:
   adjusting the quantization parameter based on a proportional value, an integral value or a derivative value of the bit error at each of the one or more layers.

8. The method of claim 4, wherein
   at least one of the one or more layers includes a multi-group of pictures, a group of pictures, a frame, a multi-macroblock or a macroblock.

9. The method of claim 1, comprising:
   adjusting a total number of frames in a group of pictures for each of one or more of the plurality of streams for the allocation of the target number of bits to each of the plurality of frames.

10. A system comprising:
    circuitry configured to
       determine an overall number of bits per time interval that corresponds to transferring a frame in a transport stream, the transport stream including a plurality of streams each generated according to a different encoding standard; and allocate a target number of bits to each of a plurality of frames of the plurality of streams to achieve the overall number of bits for the transport stream based on a frame type of each of the plurality of frames and the different encoding standards according to which each of the plurality of streams is generated.

11. The system of claim 10, wherein
the circuitry is configured to determine a target number of bits for a macroblock of each of the plurality of frames based on the target number of bits allocated to each of the plurality of frames.

12. The system of claim 11, wherein
the circuitry is configured to calculate a quantization parameter for the macroblock based on the target number of bits determined for the macroblock.

13. The system of claim 12, wherein
the circuitry is configured to determine rate control information associated with the macroblock at each of one or more layers of each of the plurality of streams.

14. The system of claim 13, wherein
the circuitry is configured to adjust the quantization parameter calculated for each of the one or more layers based on the rate control information at each of the one or more layers to generate a final quantization parameter.

15. The system of claim 10, wherein
the rate control information at a layer comprises a bit error that corresponds to a difference between an actual number of bits generated during encoding for the layer and a target number of bits corresponding to the actual number of bits for the layer.

16. The system of claim 15, wherein
the circuitry is configured to adjust the quantization parameter based on a proportional value, an integral value or a derivative value of the bit error at one or more layers of each of the plurality of streams.

17. The system of claim 13, wherein
at least one of the one or more layers includes a multi-group of pictures, a group of pictures, a frame, a multi-macroblock or a macroblock.

18. The system of claim 10, wherein,
the circuitry is configured to adjust a total number of frames in a group of pictures for each of one or more of the plurality of streams for the allocation of the target number of bits to each of the plurality of frames.

19. The system of claim 10, wherein
the circuitry includes a rate control module.

20. A non-transitory computer-readable medium including computer program instructions, which when executed by circuitry, causes the circuitry to:

determine an overall number of bits per time interval that corresponds to transferring a frame in a transport stream, the transport stream including a plurality of streams each generated according to a different encoding standard; and allocate a target number of bits to each of a plurality of frames of the plurality of streams to achieve the overall number of bits for the transport stream based on a frame type of each of the plurality of frames and the different encoding standards according to which each of the plurality of streams is generated.

\* \* \* \* \*